S. JACOBSON & F. E. ANDERSON.
STEERING APPARATUS.
APPLICATION FILED JULY 24, 1913.
1,107,073. Patented Aug. 11, 1914.
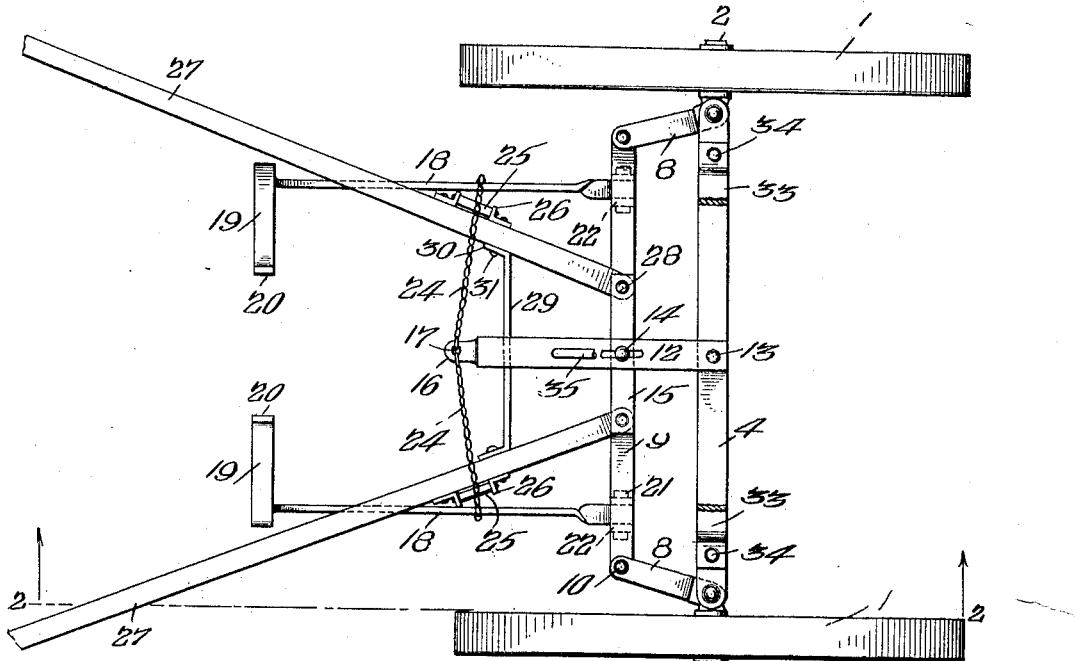
WITNESSES
E. W. Callaghan
C. E. Trainor
INVENTORS
SEVERT JACOBSON,
FRANK E. ANDERSON
BY Munn & Co
ATTORNEYS

UNITED STATES PATENT OFFICE.

SEVERT JACOBSON AND FRANK E. ANDERSON, OF LYNCH, NEBRASKA.

STEERING APPARATUS.

1,107,073.  Specification of Letters Patent.  Patented Aug. 11, 1914.

Application filed July 24, 1913. Serial No. 780,927.

*To all whom it may concern:*

Be it known that we, SEVERT JACOBSON and FRANK E. ANDERSON, citizens of the United States, and residents of Lynch, in the county of Boyd and State of Nebraska, have made certain new and useful Improvements in Steering Apparatus, of which the following is a specification.

Our invention is an improvement in steering apparatus for carts and the like, wherein mechanism is provided operated by the feet of the driver, for simultaneously swinging the wheels on a vertical axis, to steer or guide the vehicle.

In the drawings: Figure 1 is a top plan view of a cart provided with the improved steering apparatus, with parts broken away, and Fig. 2 is a section on the line 2—2 of Fig. 1, looking in the direction of the arrows.

In the present embodiment of the invention the wheels 1 are journaled on spindles 2, and each spindle is provided at its inner end with a vertical sleeve 3. The spindles are connected by means of upper and lower plates 4 and 5, the said plates forming the axle. A seat 32 is arranged above the axle, the said seat being supported by an arch bar 33. The ends of the arch bar are lapped upon the upper plate 4 near the ends thereof and bolts 34 are passed through the said ends of the arch bar and through the upper and lower plates for connecting them together. Spacing sleeves, not shown, are arranged between the plates on the bolts 34 to space the plates 4 and 5. The sleeves 3 of the spindles are arranged between the ends of the plates 4 and 5 and are pivoted to the plates by means of bolts 6, the said bolts passing through the sleeves and through registering openings in the plates. Each sleeve is provided with a forwardly and inwardly extending arm 8, and a bar 9 connects the said arms. The bar 9 is in front of the axle and approximately parallel therewith, and bolts 10 are passed through the lapping ends of the arms and the bar for pivotally connecting the arms to the bar. Each bolt is engaged by a nut 11 below the plate 9. A tongue is connected with the axle, and with the bar 9, the said tongue comprising an upper plate 12 and a lower plate $12^a$. The rear ends of the plates 12 and $12^a$ engage the outer faces of the plates 4 and 5 respectively, and a bolt 13 pivotally connects the said ends to the plates. A bolt 14 is passed through the plates 12 and $12^a$ and through the bar 9 for pivotally connecting the tongue to the bar. Shafts 27 are connected with the bar 9, the rear ends of the said shafts resting upon the upper face of the bar on each side of the tongue. A short plate 15 is arranged on the ends of the shafts, and the said plate 15 passes under the plate 12 at the center of the said short plate. The bolt 14, before mentioned, is passed through the short plate 15, thus pivotally connecting the tongue to the plate 15 as well as to the bar 9.

It will be noticed that the rear end of the plate $12^a$ is offset downwardly as shown in Fig. 2 in rear of the bar 9. The tongue is provided at its front end with a perforated lug 16 and guiding means is connected with the perforation 17 of the lug. The openings in the plates 12 and $12^a$ through which the bolt 14 extends are elongated longitudinally of the said plates, in order to permit a limited movement of the bolt 14 and of the bar 9 with respect to the tongue.

Levers 18 are connected with the under face of the bar 9 near each end thereof, each lever curving upwardly at its forward end, as indicated at $18^a$ in Fig. 2, and at the said forward end each lever is provided with a foot plate 19, for engagement by the feet of the operator, to swing the said lever. Each of the bars 18 is composed of bar material having its wide dimension vertical, and the foot plates 19 are formed by bending the outer end of the curved portion $18^a$ laterally outward and then horizontally inward, and each foot plate is provided with an upstanding lug or stop 20 at its inner end. At its inner end each of the levers 18 is given a quarter turn, as shown in Figs. 1 and 2, and is then bent to form a bearing. Each of the bearings is engaged by a bolt 21, supported in bearing lugs 22 on the under face of the bar 9, the pairs of bearing lugs being near the ends of the bar. The levers are thus hinged to swing vertically on the bolts 21, and each lever is provided with an opening 23 intermediate its end, with which one end of a chain 24 is engaged. The chains 24 pass upwardly over rollers 25 journaled in bearing brackets 26 on the adjacent shaft 27 of a pair which is connected to the bar 9, and thence inwardly to a connection with the opening 17 of the lug 16, before mentioned, at the front end of the tongue.

It will be evident from the description that when the front end of either of the levers 18 is pressed downwardly, traction will be exerted upon the chain 24 to which the said lever is connected, and the front end of the tongue will be caused to swing toward the lever depressed. When the operator depresses one of the levers 18 by means of the foot plate connected thereto, the other lever will be lifted, and as the tongue swings toward the lever depressed, it will move the bar 9, and the short plate 12 therewith, thus swinging the said plate and bar longitudinally of the axle. The bar 9 is in fact a link connecting the arms 8, and when either foot plate is depressed, the front end of the tongue will move toward the depressed lever, and the connecting link will move in the same direction longitudinally of the said link. When the bar 9 moves longitudinally of the axle in either direction the arms 8 will be swung in the same direction, angularly with respect to the axle. When for instance, the tongue is swung toward the top of Fig. 1, the connecting link 9 will be moved in the same direction, moving however, parallel to the axle, and the wheels will be shifted to guide the machine in the same direction that the bar 9 is moved. The shafts are rigidly connected by means of a cross brace 29 in front of the bar 9, the said brace having its ends bent laterally, as shown at 30, and secured to the shaft by means of bolts 31. A seat 32 is arranged above the axle, said seat being supported on an arch bar 33 having its ends secured to the top plate 4 of the axle, by means of bolts 34. The seat is braced against forward movement by means of the inclined brace rod 35, which has one end connected with the body of the arch bar, and the other end connected with the top plate 12 of the tongue.

It will be evident that with the improved steering mechanism the driver can at any time change the direction of motion of the vehicle, merely by depressing that lever 18 toward which he desires to turn. When either lever 18 is depressed to change the direction of motion of the vehicle, the entire supporting frame is shifted with respect to the axle.

We claim:

1. In combination, an axle, a spindle at each end of the axle, a pivotal connection between each spindle and the axle for permitting the spindle to swing on a vertical axis, a wheel on each spindle, each spindle having a rigid arm extending forwardly and inwardly, a bar connecting the arms and pivoted at each end to the adjacent arm, a tongue pivoted to the axle at the center thereof and extending forwardly beyond the bar, a pivotal connection between the tongue and the bar, a lever hinged at its inner end to the under face of the bar near each end thereof, each lever having a foot plate at its forward end, a flexible connection between each lever and the forward end of the tongue, and shafts attached to the bar on each side of the tongue and extending forwardly and outwardly, each shaft having a roller over which the adjacent chain passes.

2. In combination, an axle, a spindle at each end of the axle, a pivotal connection between each spindle and the axle for permitting the spindle to swing on a vertical axis, a wheel on each spindle, each spindle having a rigid arm extending forwardly and inwardly, a bar connecting the arms and pivoted at each end to the adjacent arm, shafts connected with the bar and extending forwardly therefrom, a rigid connection between the shafts, a tongue pivoted to the axle at the center thereof and extending forwardly between the shafts beyond the bar, a pivotal connection between the tongue and the bar, a lever hinged at its inner end to the under face of the bar near each end thereof, each lever having a foot plate at its forward end, and a flexible connection between each lever and the forward end of the tongue and passing over the adjacent shaft.

3. In a vehicle of the character specified and comprising an axle, a spindle pivoted to each end of the axle on a vertical axis, a wheel on each spindle, an arm extending rigidly forward from each spindle, and a bar connecting the arms and pivoted thereto, a tongue pivoted to the axle and to the bar at the center of the axle and the bar and extending forwardly of the bar, a lever pivoted at one end to the bar near each end thereof, each lever having a foot plate at its forward end, a connection between each lever and the front end of the tongue, and a support on the frame over which each of the said connections pass.

SEVERT JACOBSON.
FRANK E. ANDERSON.

Witnesses:
G. A. BARNES,
C. P. KLOKE.

---

"Copies of this patent may be obtained for five cents each, by addressing the 'Commissioner of Patents, Washington, D. C.'"